US010924222B2

(12) United States Patent
Sun et al.

(10) Patent No.: US 10,924,222 B2
(45) Date of Patent: Feb. 16, 2021

(54) METHOD FOR SENDING INDICATION INFORMATION, METHOD FOR SENDING HARQ-ACK, AND DEVICE

(71) Applicant: Huawei Technologies Co., Ltd., Guangdong (CN)

(72) Inventors: Wei Sun, Shenzhen (CN); Zhiheng Guo, Beijing (CN); Xinqian Xie, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/266,841

(22) Filed: Feb. 4, 2019

(65) Prior Publication Data

US 2019/0173621 A1 Jun. 6, 2019

Related U.S. Application Data

(63) Continuation of application No. PCT/CN2017/093513, filed on Jul. 19, 2017.

(30) Foreign Application Priority Data

Aug. 10, 2016 (CN) .......................... 201610652346.9

(51) Int. Cl.
*H04L 1/18* (2006.01)
*H04W 76/11* (2018.01)
(Continued)

(52) U.S. Cl.
CPC .......... *H04L 1/1819* (2013.01); *H04L 1/1854* (2013.01); *H04L 1/1861* (2013.01);
(Continued)

(58) Field of Classification Search
CPC combination set(s) only.
See application file for complete search history.

(56) References Cited

U.S. PATENT DOCUMENTS

2013/0148563 A1 6/2013 Brueck et al.
2015/0282208 A1 10/2015 Yi et al.
(Continued)

FOREIGN PATENT DOCUMENTS

CN 102082643 A 6/2011
CN 102333381 A 1/2012
(Continued)

OTHER PUBLICATIONS

InterDigital et al., "WF on Implicit Dependencies Assumptions," R1-165607, 3GPP TSG RAN WG1 #85, Nanjing, China, May 23-27, 2016, 3 pages.

*Primary Examiner* — Lakeram Jangbahadur
(74) *Attorney, Agent, or Firm* — Kilpatrick Townsend & Stockton LLP

(57) ABSTRACT

A method includes: sending, by a first terminal device, an HARQ-ACK to a network device based on received HARQ-ACK feedback indication information sent by the network device, where the HARQ-ACK feedback indication information is used to indicate a transmission time interval commonly occupied by at least one terminal device to feed back an HARQ-ACK and proprietary information about an HARQ-ACK fed back by each terminal device, and the at least one terminal device includes the first terminal device. In this technical solution, HARQ-ACK feedback indication information can indicate proprietary information about an HARQ-ACK fed back by a terminal device, thereby reducing a load of an uplink control channel when the terminal device feeds back the HARQ-ACK.

11 Claims, 5 Drawing Sheets

(51) Int. Cl.
*H04L 5/00* (2006.01)
*H04W 72/04* (2009.01)

(52) U.S. Cl.
CPC .......... *H04L 1/1864* (2013.01); *H04L 5/0055* (2013.01); *H04W 72/0446* (2013.01); *H04W 76/11* (2018.02)

(56) References Cited

U.S. PATENT DOCUMENTS

| | | | | |
|---|---|---|---|---|
| 2016/0192388 A1* | 6/2016 | Ekpenyong | ........... | H04L 1/1829 370/329 |
| 2017/0325277 A1* | 11/2017 | Fujishiro | ................. | H04W 4/06 |
| 2018/0027525 A1* | 1/2018 | Xia | ....................... | H04W 28/06 370/329 |
| 2018/0132265 A1* | 5/2018 | Guan | .................... | H04W 76/00 |

FOREIGN PATENT DOCUMENTS

| | | | |
|---|---|---|---|
| CN | 102468942 | A | 5/2012 |
| EP | 2693675 | A1 | 2/2014 |
| EP | 3051734 | A1 | 8/2016 |
| WO | 2013071754 | A1 | 5/2013 |
| WO | 2016121567 | A1 | 8/2016 |

\* cited by examiner

METHOD FOR SENDING INDICATION INFORMATION, METHOD FOR SENDING HARQ-ACK, AND DEVICE

CROSS-REFERENCE TO RELATED APPLICATIONS

This application is a continuation of International Application No. PCT/CN2017/093513, filed on Jul. 19, 2017, which claims priority to Chinese Patent Application No. 201610652346.9, filed on Aug. 10, 2016, the disclosures of the aforementioned applications are hereby incorporated by reference in their entireties.

TECHNICAL FIELD

The present application relates to the field of wireless communications technologies, and in particular, to a method for sending indication information, a method for sending an HARQ-ACK, and a device.

BACKGROUND

In a wireless communications system, reliability of data transmission is usually improved by using a hybrid automatic repeat request (HARD) technology. Downlink transmission is used as an example. A base station sends data to a terminal; and after the terminal receives the data sent by the base station, if the terminal determines that the received data is correct, the terminal feeds back an acknowledgement (ACK) to the base station; or if the terminal determines that the received data is incorrect, the terminal feeds back an Negative Acknowledgement (NACK) to the base station, and then the base station re-sends data.

In a time division duplex (TDD) Long Term Evolution (LTE) system, as shown in Table 1, time sequences of uplink subframes and downlink subframes are determinate. In Table 1, D represents a downlink subframe, U represents an uplink subframe, and S represents a special subframe. The special subframe includes a downlink pilot time slot (DwPTS), a guard period (GP), and an uplink pilot time slot (UpPTS). Downlink transmission is used as an example. An uplink subframe used to feed back an HARQ-ACK is determined based on a time sequence relationship between a downlink subframe shown in Table 2 and a fed-back HARQ-ACK. An uplink subframe 2 of an uplink-downlink configuration 1 is used as an example. The uplink subframe 2 corresponds to 6 and 7, and this indicates that the uplink subframe 2 is used to feed back |2-7| and |2-6|, that is, information about HARQ-ACKs corresponding to a downlink subframe 5 and a downlink subframe 4.

TABLE 1

| Uplink-downlink configuration | Uplink-to-downlink switching period (ms) | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 | D | S | U | U | U | D | S | U | U | U |
| 1 | 5 | D | S | U | U | D | D | S | U | U | D |
| 2 | 5 | D | S | U | D | D | D | S | U | D | D |
| 3 | 10 | D | S | U | U | U | D | D | D | D | D |
| 4 | 10 | D | S | U | U | D | D | D | D | D | D |
| 5 | 10 | D | S | U | D | D | D | D | D | D | D |
| 6 | 5 | D | S | U | U | U | D | S | U | U | D |

TABLE 2

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

However, with development of wireless communications technologies, wireless communications systems can support a more flexible subframe structure, for example, flexibly schedule a subframe or a TTI (Transmission Time Interval) for uplink transmission or downlink transmission, to support various uplink-downlink service requirements. In such a wireless system supporting a flexible subframe structure, how to feed back an HARQ-ACK is a problem that needs to be urgently resolved.

In the prior art, a base station sends, to a terminal, downlink control information (DCI) carrying information used to indicate a TTI or a subframe used by the terminal to transmit an HARQ-ACK, to indicate the subframe or the TTI in which the terminal feeds back the HARQ-ACK. However, in such a manner of indicating the terminal to feed back the HARQ-ACK, because the terminal feeds back the HARQ-ACK to the base station based on a preset maximum quantity of bits for feeding back an HARQ-ACK, redundancy of HARQ-ACK information may be caused, and performance of an uplink control channel is often limited.

SUMMARY

The present disclosure provides a method for sending indication information, a method for sending an HARQ-ACK, and a device, to resolve a problem that performance and capacities of a downlink control channel and an uplink control channel are limited in a flexible system uplink-downlink configuration when a terminal device feeds back an HARQ-ACK.

According to a first aspect, a method for sending indication information is provided, including:

determining, by a network device, hybrid automatic repeat request-acknowledgment HARQ-ACK feedback indication information used to instruct at least one terminal device to feed back, where the HARQ-ACK feedback indication information is used to indicate a transmission time interval commonly occupied by the at least one terminal device to feed back an HARQ-ACK and proprietary information about an HARQ-ACK fed back by each of the at least one terminal device, and the proprietary information includes a bit quantity of the HARQ-ACK that each of the at least one terminal device needs to feed back and/or a channel resource used by each terminal device to feed back the HARQ-ACK; and sending the HARQ-ACK feedback indication information to the at least one terminal device.

Because the HARQ-ACK feedback indication information that is sent by the network device to at least one terminal device includes not only a transmission time interval commonly occupied by the at least one terminal device to feed back HARQ-ACKs, but also proprietary information about the HARQ-ACKs fed back by the at least one terminal device, limitation of performance of a downlink control channel is avoided. In addition, compared with the prior art in which the network device indicates only a subframe or a TTI in which an HARQ-ACK is fed back, the at least one terminal device can feed back the HARQ-ACKs to the network device based on proprietary information that is in the indication information and that is used to instruct the at least one terminal device to feed back the HARQ-ACKs, thereby avoiding redundancy when the at least one terminal device feeds back the HARQ-ACKs and limitation of performance of an uplink control channel.

Based on the first aspect, optionally, the network device sends first downlink control information to the at least one terminal device, where the first downlink control information includes the HARQ-ACK feedback indication information.

Because the HARQ-ACK feedback indication information is sent to the at least one terminal device by using the first downlink control information, load of the downlink control channel is reduced.

Based on the first aspect, optionally, the first downlink control information is transmitted in a common search space of a downlink control channel.

Based on the first aspect, optionally, the network device includes a plurality of preset radio network temporary identifiers RNTIs used to scramble the first downlink control information; and the network device searches, based on a terminal group to which the at least one terminal device belongs, the plurality of preset RNTIs for an RNTI subset corresponding to the terminal group, and selects an RNTI from the RNTI subset to scramble the first downlink control information; and sends the HARQ-ACK feedback indication information to the at least one terminal device after separately sending an identifier number of the selected RNTI to the at least one terminal device, where the identifier number is used to uniquely identify the selected RNTI.

One piece of HARQ-ACK feedback indication information is used to instruct a group of terminal devices to feed back HARQ-ACKs to a network device. Therefore, this avoids that when too many terminal devices exist in an area served by the network device, limited by a bearer capacity of signaling carrying the HARQ-ACK feedback indication information, the network device cannot send the HARQ-ACK feedback indication information to the terminal devices.

Based on the first aspect, optionally, the network device separately sends second downlink control information to the at least one terminal device, where the second downlink control information includes the identifier number of the selected RNTI.

Based on the first aspect, optionally, the network device sends, to an $N^{th}$ terminal device of the at least one terminal device, location index information corresponding to the $N^{th}$ terminal device, where the location index information is used to indicate a location of a bit quantity of an HARQ-ACK fed back by the $N^{th}$ terminal device and/or a channel resource used to feed back the HARQ-ACK in the HARQ-ACK feedback indication information, and N ranges from 1 to a quantity of the at least one terminal device.

Because the HARQ-ACK feedback indication information includes proprietary information used to instruct a plurality of terminal devices, and the location index information is sent to the terminal devices by using the network device, to instruct the terminal devices to read information at corresponding locations in the HARQ-ACK feedback indication information, so that correctness of parsing the HARQ-ACK feedback indication information by the terminal devices is ensured.

Based on the first aspect, optionally, the network device sends third downlink control information to the $N^{th}$ terminal device, where the third downlink control information includes the location index information.

Based on the first aspect, optionally, the indicating, by the network device, the transmission time interval commonly occupied by the at least one terminal device to feed back the HARQ-ACK includes:

indicating, by the network device, an offset value between the transmission time interval commonly occupied by the at least one terminal device to feed back the HARQ-ACK and a transmission time interval occupied to send the HARQ-ACK feedback indication information, where the offset value is used to indicate a quantity of transmission time intervals between the transmission time interval commonly occupied by the at least one terminal device to feed back the HARQ-ACK and the transmission time interval occupied to send the HARQ-ACK feedback indication information; or indicating, by the network device, a number of the transmission time interval commonly occupied by the at least one terminal device to feed back the HARQ-ACK.

Because the transmission time interval commonly occupied by the at least one terminal device to feed back the HARQ-ACK is indicated by using the offset value and the number of the transmission time interval, compared with the prior art in which the transmission time interval occupied by the terminal device to feed back the HARQ-ACK is indicated by using an offset value between a transmission time interval occupied by downlink transmission data and a transmission time interval occupied to send the HARQ-ACK, a bit quantity occupied to indicate the transmission time interval commonly occupied by the at least one terminal device to feed back the HARQ-ACK is reduced.

According to a second aspect, a method for sending a hybrid automatic repeat request-acknowledgment HARQ-ACK is provided, including:

receiving, by a first terminal device, HARQ-ACK feedback indication information sent by a network device, and sending an HARQ-ACK to the network device based on a transmission time interval commonly occupied by at least one terminal device to feed back an HARQ-ACK and proprietary information about the HARQ-ACK fed back by the first terminal device in the HARQ-ACK feedback indication information, where the HARQ-ACK feedback indication information is used to indicate the transmission time interval commonly occupied by the at least one terminal device to feed back the HARQ-ACK and the proprietary information about an HARQ-ACK fed back by each of the at least one terminal device, the proprietary information includes a bit quantity of the HARQ-ACK that each of the at least one terminal device needs to feed back and/or a channel resource used by each terminal device to feed back the HARQ-ACK, and the at least one terminal device includes the first terminal device.

Based on the second aspect, optionally, the first terminal device receives first downlink control information, where the first downlink control information includes the HARQ-ACK feedback indication information.

Based on the second aspect, optionally, the first downlink control information is transmitted in a common search space of a downlink control channel.

Based on the second aspect, optionally, the first terminal device pre-stores a correspondence between at least one radio network temporary identifier RNTI and an identifier number respectively corresponding to the at least one RNTI, the RNTI is in a one-to-one correspondence with the identifier number, the at least one RNTI belongs to an RNTI subset corresponding to a terminal group to which the first terminal device belongs, and the RNTI subset is a subset of a plurality of RNTIs that are preset in the network device to scramble the first downlink control information; and the first terminal device receives an identifier number of an RNTI that is sent by the network device to scramble the first downlink control information; searches, based on the correspondence, the at least one RNTI for the RNTI corresponding to the received identifier number; and descrambles the received first downlink control information based on the found RNTI, and then sends the HARQ-ACK to the network device.

Based on the second aspect, optionally, the first terminal device receives second downlink control information sent by the network device, where the second downlink control information includes the identifier number of the RNTI used to scramble the first downlink control information.

Based on the second aspect, optionally, the first terminal device receives location index information that is sent by the network device and that corresponds to the first terminal device, where the location index information is used to indicate a location of a bit quantity of the HARQ-ACK fed back by the first terminal device and/or a channel resource used to feed back the HARQ-ACK in the HARQ-ACK feedback indication information.

Based on the second aspect, optionally, the first terminal device receives third downlink control information sent by the network device, where the third downlink control information includes the location index information corresponding to the first terminal device.

Based on the second aspect, optionally, the first terminal device determines, in the following manners, a transmission time interval occupied to send the HARQ-ACK:

based on an offset value between the transmission time interval commonly occupied by the at least one terminal device to feed back the HARQ-ACK and included in the HARQ-ACK feedback indication information and a transmission time interval occupied to send the HARQ-ACK feedback indication information, determining, by the first terminal device, the transmission time interval occupied to send the HARQ-ACK, where the offset value is used to indicate a quantity of transmission time intervals between the transmission time interval commonly occupied by the at least one terminal device to feed back the HARQ-ACK and the transmission time interval occupied to send the HARQ-ACK feedback indication information; or based on a number of the transmission time interval that is commonly occupied by the at least one terminal device to feed back the HARQ-ACK and that is included in the HARQ-ACK feedback indication information, determining, by the first terminal device, the transmission time interval occupied to send the HARQ-ACK.

According to a third aspect, a network device is provided, including a processing unit and a transceiver unit, where the processing unit is configured to determine hybrid automatic repeat request-acknowledgment HARQ-ACK feedback indication information used to instruct at least one terminal device to feed back, where the HARQ-ACK feedback indication information is used to indicate a transmission time interval commonly occupied by the at least one terminal device to feed back an HARQ-ACK and proprietary information about an HARQ-ACK fed back by each of the at least one terminal device, and the proprietary information includes a bit quantity of the HARQ-ACK that each of the at least one terminal device needs to feed back and/or a channel resource used by each terminal device to feed back the HARQ-ACK; and the transceiver unit is configured to send the HARQ-ACK feedback indication information to the at least one terminal device.

Based on the third aspect, optionally, the transceiver unit is specifically configured to send first downlink control information to the at least one terminal device, where the first downlink control information includes the HARQ-ACK feedback indication information.

Based on the third aspect, optionally, the first downlink control information is transmitted in a common search space of a downlink control channel.

Based on the third aspect, optionally, the network device includes a plurality of preset radio network temporary identifiers RNTIs used to scramble the first downlink control information; the processing unit is further configured to: before the transceiver unit sends the first downlink control information to the at least one terminal device, search, based on a terminal group to which the at least one terminal device belongs, the plurality of preset RNTIs for an RNTI subset corresponding to the terminal group, and select an RNTI from the RNTI subset to scramble the first downlink control information; and the transceiver unit is further configured to separately send an identifier number of the selected RNTI to the at least one terminal device, where the identifier number is used to uniquely identify the selected RNTI.

Based on the third aspect, optionally, the transceiver unit is specifically configured to separately send second downlink control information to the at least one terminal device, where the second downlink control information includes the identifier number of the selected RNTI.

Based on the third aspect, optionally, the processing unit is further configured to send, to an $N^{th}$ terminal device of the at least one terminal device, location index information corresponding to the $N^{th}$ terminal device, where the location index information is used to indicate a location of a bit quantity of an HARQ-ACK fed back by the $N^{th}$ terminal device and/or a channel resource used to feed back the HARQ-ACK in the HARQ-ACK feedback indication information, and N ranges from 1 to a quantity of the at least one terminal device.

Based on the third aspect, optionally, the transceiver unit is specifically configured to send third downlink control information to the $N^{th}$ terminal device, where the third downlink control information includes the location index information.

Based on the third aspect, optionally, the processing unit is specifically configured to: indicate an offset value between the transmission time interval commonly occupied by the at least one terminal device to feed back the HARQ-ACK and a transmission time interval occupied to send the HARQ-ACK feedback indication information, where the offset value is used to indicate a quantity of transmission time intervals between the transmission time interval commonly occupied by the at least one terminal device to feed back the HARQ-ACK and the transmission time interval occupied to send the HARQ-ACK feedback indication information; or indicate a number of the transmission time interval commonly occupied by the at least one terminal device to feed back the HARQ-ACK.

According to a fourth aspect, a terminal device is provided, including a receiving unit, a processing unit, and a sending unit, where the receiving unit is configured to receive HARQ-ACK feedback indication information sent by a network device, where the HARQ-ACK feedback indication information is used to indicate a transmission time interval commonly occupied by at least one terminal device to feed back an HARQ-ACK and proprietary information about an HARQ-ACK fed back by each of the at least one terminal device, the proprietary information includes a bit quantity of the HARQ-ACK that each of the at least one terminal device needs to feed back and/or a channel resource used by each terminal device to feed back the HARQ-ACK, and the at least one terminal device includes the terminal device in which the receiving unit is located; the processing unit is configured to determine, based on the HARQ-ACK feedback indication information, a transmission time interval occupied by the terminal device in which the processing unit is located to feed back an HARQ-ACK to the network device and proprietary information about the HARQ-ACK fed back by the terminal device in which the processing unit is located; and the sending unit is configured to send the HARQ-ACK to the network device based on the determined transmission time interval occupied to feed back the HARQ-ACK to the network device and the determined proprietary information about the HARQ-ACK fed back.

Based on the fourth aspect, optionally, the receiving unit is specifically configured to receive first downlink control information, where the first downlink control information includes the HARQ-ACK feedback indication information.

Based on the fourth aspect, optionally, the first downlink control information is transmitted in a common search space of a downlink control channel.

Based on the fourth aspect, optionally, the terminal device pre-stores a correspondence between at least one radio network temporary identifier RNTI and an identifier number respectively corresponding to the at least one RNTI, the RNTI is in a one-to-one correspondence with the identifier number, the at least one RNTI belongs to an RNTI subset corresponding to a terminal group to which the terminal device belongs, and the RNTI subset is a subset of a plurality of RNTIs that are preset in the network device to scramble the first downlink control information; the receiving unit is further configured to: before the sending unit sends the HARQ-ACK to the network device, receive an identifier number of an RNTI that is sent by the network device to scramble the first downlink control information; and the processing unit is configured to: search, based on the correspondence, the at least one RNTI for the RNTI corresponding to the received identifier number, and descramble the received first downlink control information based on the found RNTI.

Based on the fourth aspect, optionally, the receiving unit is specifically configured to receive second downlink control information sent by the network device, where the second downlink control information includes the identifier number of the RNTI used to scramble the first downlink control information.

Based on the fourth aspect, optionally, the receiving unit is further configured to receive location index information that is sent by the network device and that corresponds to the terminal device, where the location index information is used to indicate a location of a bit quantity of the HARQ-ACK fed back by the terminal device and/or a channel resource used to feed back the HARQ-ACK in the HARQ-ACK feedback indication information.

Based on the fourth aspect, optionally, the receiving unit is specifically configured to receive third downlink control information sent by the network device, where the third downlink control information includes the location index information corresponding to the terminal device.

Based on the fourth aspect, optionally, the processing unit determines, in the following manners, the transmission time interval occupied to send the HARQ-ACK:

based on an offset value between the transmission time interval commonly occupied by the at least one terminal device to feed back the HARQ-ACK and included in the HARQ-ACK feedback indication information and a transmission time interval occupied to send the HARQ-ACK feedback indication information, determining the transmission time interval occupied to send the HARQ-ACK, where the offset value is used to indicate a quantity of transmission time intervals between the transmission time interval commonly occupied by the at least one terminal device to feed back the HARQ-ACK and the transmission time interval occupied to send the HARQ-ACK feedback indication information; or based on a number of the transmission time interval that is commonly occupied by the at least one terminal device to feed back the HARQ-ACK and that is included in the HARQ-ACK feedback indication information, determining the transmission time interval occupied to send the HARQ-ACK.

DESCRIPTION OF EMBODIMENTS

To make the objectives, technical solutions, and advantages of this application clearer, the following further describes this application in detail with reference to the accompanying drawings.

It should be understood that a network device in embodiments of the present disclosure may be a base station, for example, an evolved NodeB (eNB) or a NodeB, configured to communicate with a terminal device, and the network device may further be a base station in a 5G communications system. The terminal device in the embodiments of the present disclosure may also be referred to as user equipment (UE), an mobile station (MS), a mobile terminal, or the like. Optionally, the terminal device may be a mobile phone, a tablet computer, a personal digital assistant (PDA), a point of sale (POS), an in-vehicle computer, a set top box, or the like.

Figure 1:
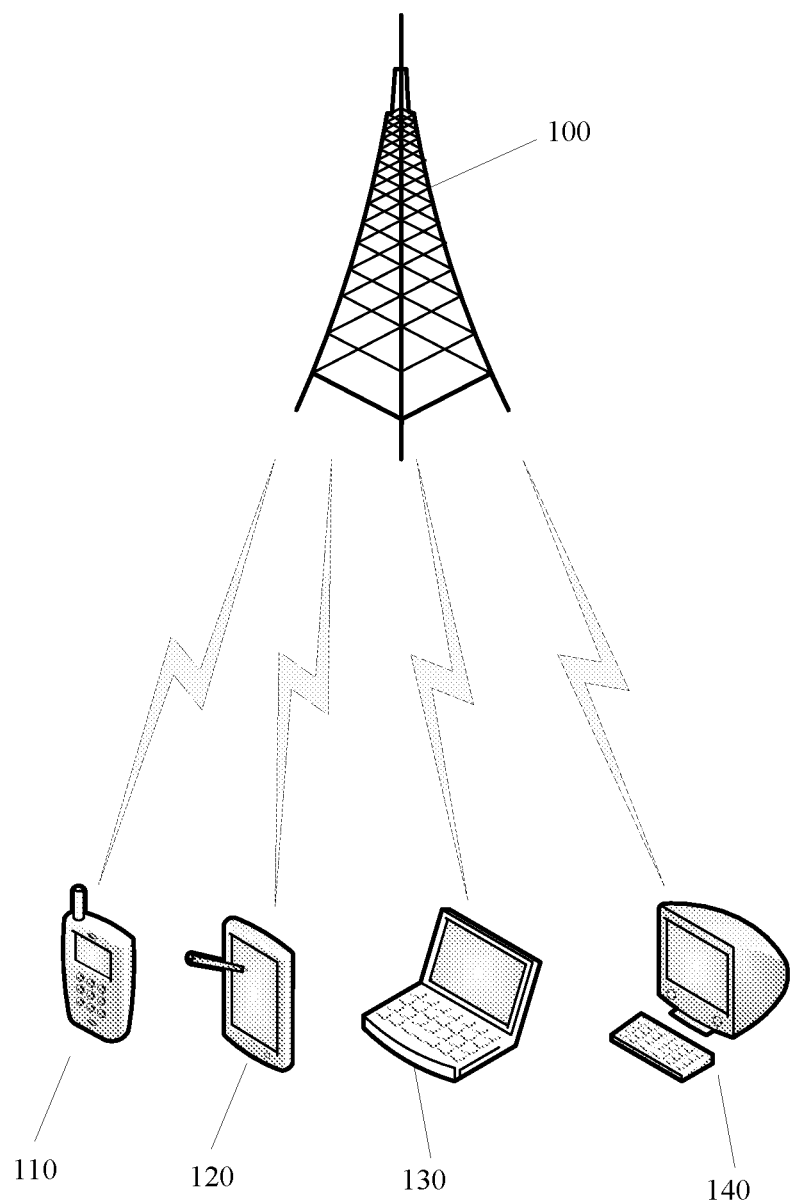
FIG. 1 is a schematic diagram of a network structure applied to an embodiment of the present disclosure.

FIG. 1 is a schematic diagram of a network structure applied to an embodiment of the present disclosure. The network structure includes a network device 100, a terminal device 110, a terminal device 120, a terminal device 130, and a terminal device 140. FIG. 1 shows a case of including only four terminal devices. In the embodiments of the present disclosure, a quantity of terminal devices is not limited.

Because in the embodiments of the present disclosure, HARQ-ACK feedback indication information that is sent by a network device to terminal devices includes not only a transmission time interval commonly occupied by the terminal devices to feed back HARQ-ACKs, but also proprietary information about the HARQ-ACKs fed back by the terminal devices, compared with the prior art in which the network device indicates only a subframe or a TTI in which an HARQ-ACK is fed back, the terminal devices can feed back the HARQ-ACKs to the network device based on proprietary information that is in the indication information and that is used to instruct the terminal devices to feed back the HARQ-ACKs, thereby avoiding redundancy when terminals feed back the HARQ-ACKs and limitation of performance of an uplink control channel.

The following uses FIG. 1 as an example to describe a method for sending an HARQ-ACK in an embodiment of the present disclosure.

Figure 2:
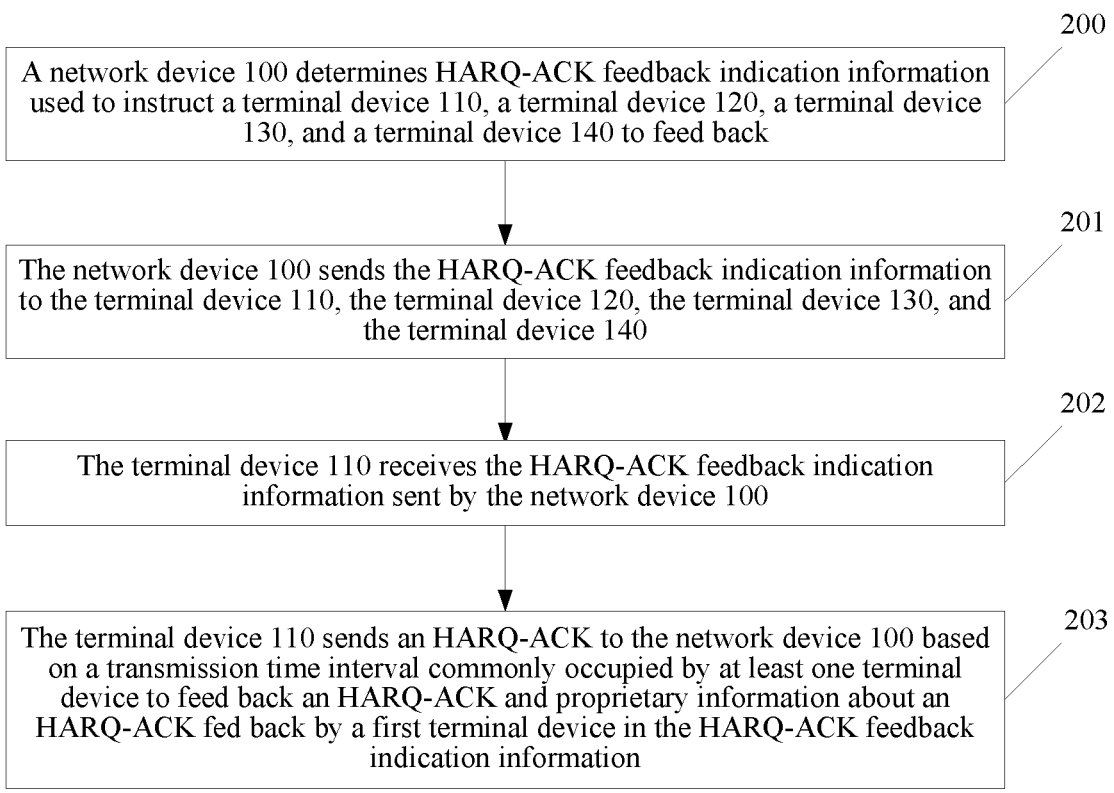
FIG. 2 is a schematic flowchart of a method for sending an HARQ-ACK according to an embodiment of the present disclosure.

Specifically, as shown in FIG. 2, the method for sending an HARQ-ACK in this embodiment of the present disclosure includes the following steps.

Step 200: The network device 100 determines HARQ-ACK feedback indication information used to instruct the terminal device 110, the terminal device 120, the terminal device 130, and the terminal device 140 to feed back, where the HARQ-ACK feedback indication information is used to indicate a transmission time interval commonly occupied by the terminal device 110, the terminal device 120, the terminal device 130, and the terminal device 140 to feed back HARQ-ACKs and proprietary information about an HARQ-ACK fed back by each of the terminal device 110, the terminal device 120, the terminal device 130, and the terminal device 140, and the proprietary information includes a bit quantity of the HARQ-ACK that each of the terminal device 110, the terminal device 120, the terminal device 130, and the terminal device 140 needs to feed back and/or a channel resource used by each of the terminal device 110, the terminal device 120, the terminal device 130, and the terminal device 140 to feed back the HARQ-ACK.

Figure 3A:
FIG. 3a and FIG. 3b are each a schematic structural diagram of HARQ-ACK feedback indication information according to an embodiment of the present disclosure.

FIG. 3a shows a format when the HARQ-ACK feedback indication information is used to indicate the transmission time interval commonly occupied by the terminal device 110, the terminal device 120, the terminal device 130, and the terminal device 140 to feed back the HARQ-ACKs and is used to indicate information about the bit quantity of the HARQ-ACK that each of the terminal device 110, the terminal device 120, the terminal device 130, and the terminal device 140 needs to feed back. 300 is used to indicate the transmission time interval commonly occupied by the terminal device 110, the terminal device 120, the terminal device 130, and the terminal device 140 to feed back the HARQ-ACKs, and 310 is used to indicate a bit quantity of an HARQ-ACK that the terminal device 110 needs to feed back. By analogy, 320 is used to indicate a bit quantity of an HARQ-ACK that the terminal device 120 needs to feed back, 330 is used to indicate a bit quantity of an HARQ-ACK that the terminal device 130 needs to feed back, and 340 is used to indicate a bit quantity of an HARQ-ACK that the terminal device 140 needs to feed back.

Figure 3B:
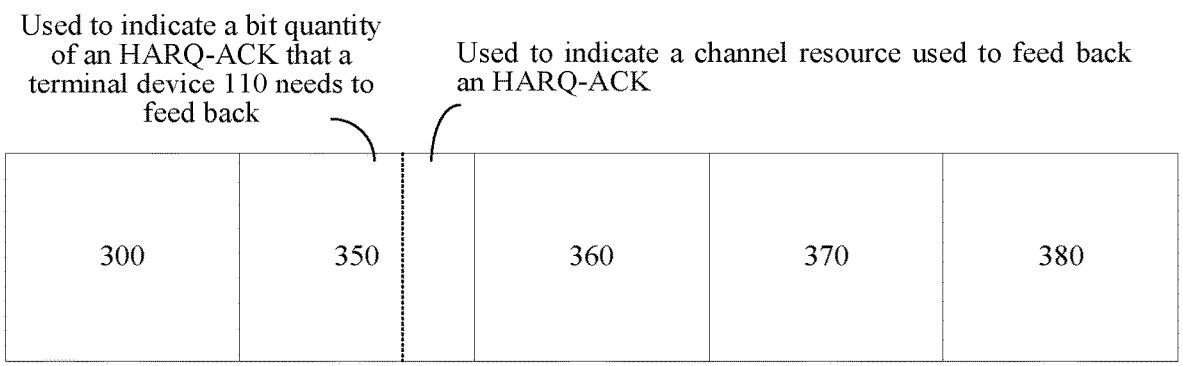

FIG. 3b shows a format when the HARQ-ACK feedback indication information is used to indicate the transmission time interval commonly occupied by the terminal device 110, the terminal device 120, the terminal device 130, and the terminal device 140 to feed back the HARQ-ACKs and is used to indicate the information about the bit quantity of the HARQ-ACK that each of the terminal device 110, the terminal device 120, the terminal device 130, and the terminal device 140 needs to feed back and the channel resource used to feed back the HARQ-ACK. 300 is used to indicate the transmission time interval commonly occupied by the terminal device 110, the terminal device 120, the terminal device 130, and the terminal device 140 to feed back the HARQ-ACKs, 350 is used to indicate the bit quantity of the HARQ-ACK that the terminal device 110 needs to feed back and a channel resource used to feed back the HARQ-ACK. By analogy, 360 is used to indicate the bit quantity of the HARQ-ACK that the terminal device 120 needs to feed back and a channel resource used to feed back the HARQ-ACK, 370 is used to indicate the bit quantity of the HARQ-ACK that the terminal device 130 needs to feed back and a channel resource used to feed back the HARQ-ACK, and 380 is used to indicate the bit quantity of the HARQ-ACK that the terminal device 140 needs to feed back and a channel resource used to feed back the HARQ-ACK.

When the HARQ-ACK feedback indication information is used to indicate the transmission time interval commonly occupied by the terminal device 110, the terminal device 120, the terminal device 130, and the terminal device 140 to feed back the HARQ-ACKs and proprietary information about an HARQ-ACK fed back by each of the terminal device 110, the terminal device 120, the terminal device 130, and the terminal device 140, the proprietary information includes the bit quantity of the HARQ-ACK that each of the terminal device 110, the terminal device 120, the terminal device 130, and the terminal device 140 needs to feed back and/or the channel resource used by each of the terminal device 110, the terminal device 120, the terminal device 130, and the terminal device 140 to feed back the HARQ-ACK.

A format used when the HARQ-ACK feedback indication information is used to indicate the transmission time interval commonly occupied by the terminal device 110, the terminal device 120, the terminal device 130, and the terminal device 140 to feed back the HARQ-ACKs and the channel resource used by each of the terminal device 110, the terminal device 120, the terminal device 130, and the terminal device 140 to feed back the HARQ-ACK is similar to that in FIG. 3a and FIG. 3b, and details are not described herein again.

It should be noted that for proprietary information that is used to instruct each of the terminal device 110, the terminal device 120, the terminal device 130, and the terminal device 140 and that is in the HARQ-ACK feedback indication information, locations of the proprietary information about the terminal devices in the HARQ-ACK feedback indication information may be arranged based on an order of scheduling, by the network device 100, the terminal device 110, the terminal device 120, the terminal device 130, and the terminal device 140, or may be arranged based on priorities of the terminal device 110, the terminal device 120, the terminal device 130, and the terminal device 140. A specific arrangement order is based on a policy preset in the network device, and is not limited to the foregoing arrangement manners in the embodiments of the present disclosure. Other arrangement manners in which the proprietary information that is used to instruct each of the terminal device 110, the terminal device 120, the terminal device 130, and the terminal device 140 and that is in the HARQ-ACK feedback indication information can be determined may be all applied to the embodiments of the present disclosure.

Step 201: The network device 100 sends the HARQ-ACK feedback indication information to the terminal device 110, the terminal device 120, the terminal device 130, and the terminal device 140.

An optional manner of sending the HARQ-ACK feedback indication information is as follows:

The network device 100 sends first downlink control information to the terminal device 110, the terminal device 120, the terminal device 130, and the terminal device 140, where the first downlink control information includes the HARQ-ACK feedback indication information.

It should be noted that the first downlink control information may be sent in a common search space of a downlink control channel.

Figure 4:
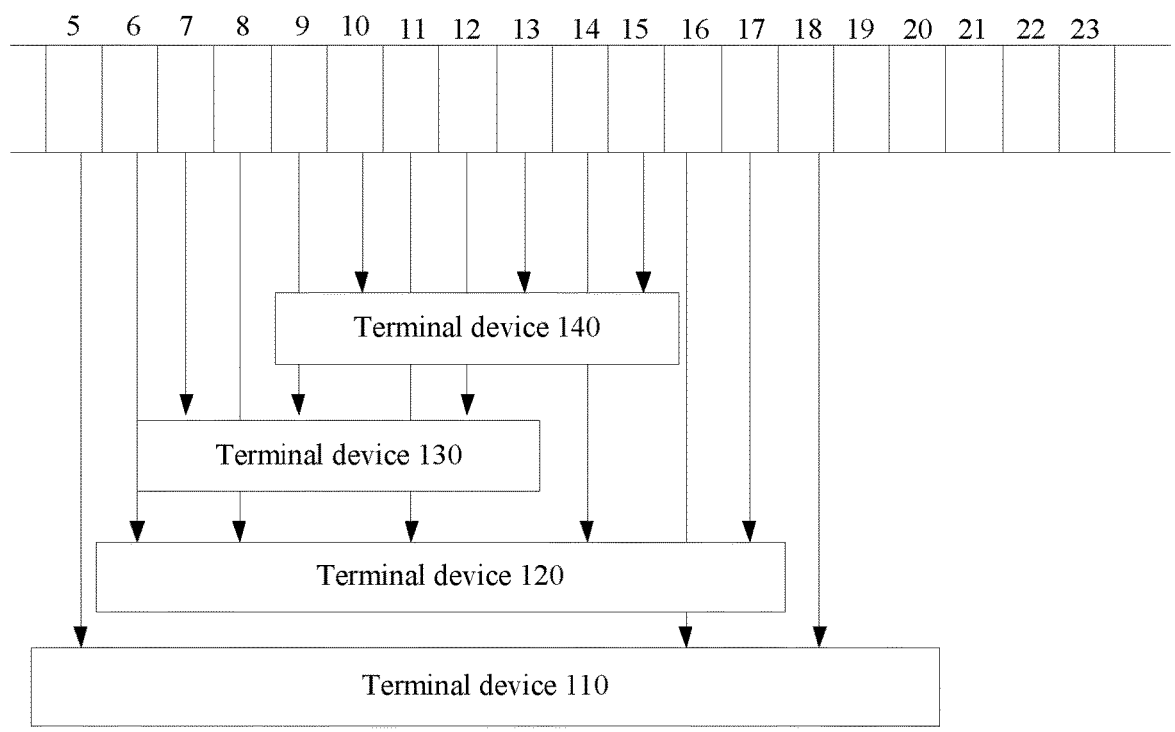
FIG. 4 is a schematic diagram of HARQ-ACK feedback indication information according to an embodiment of the present disclosure.

Specifically, as shown in FIG. 4, the network device 100 schedules downlink transmission of the terminal device 110 in transmission time intervals 5, 16, and 18, schedules downlink transmission of the terminal device 120 in transmission time intervals 6, 8, 11, 14, and 17, schedules downlink transmission of the terminal device 130 in transmission time intervals 7, 9, and 12, and schedules downlink transmission of the terminal device 140 in transmission time intervals 10, 13, and 15. Assuming that the network device 100 sends the HARQ-ACK feedback indication information in a transmission time interval 19, and receives, in a transmission time interval 21, the HARQ-ACK fed back by each of the terminal device 110, the terminal device 120, the terminal device 130, and the terminal device 140, the HARQ-ACK feedback indication information includes information used to indicate the transmission time interval 21 and proprietary information used to instruct each of the terminal device 110, the terminal device 120, the terminal device 130, and the terminal device 140 to feed back the HARQ-ACK.

Optionally, the network device indicates an offset value between a transmission time interval commonly occupied by at least one terminal device to feed back the HARQ-ACK and a transmission time interval occupied to send the HARQ-ACK feedback indication information, where the offset value is used to indicate a quantity of transmission time intervals between the transmission time interval commonly occupied by the at least one terminal device to feed back the HARQ-ACK and the transmission time interval occupied to send the HARQ-ACK feedback indication information; or the network device indicates a number of the transmission time interval commonly occupied by the at least one terminal device to feed back the HARQ-ACK.

FIG. 4 is used as an example. The information used to indicate the transmission time interval 21 in the HARQ-ACK feedback indication information may be a quantity 2 of transmission time intervals between the transmission time interval 19 and the transmission time interval 21, or a number 21 of the transmission time interval 21, where the number and the transmission time interval are in a one-to-one correspondence.

Because the first downlink control information includes the transmission time interval commonly occupied by the at least one terminal device to feed back the HARQ-ACK and proprietary information about an HARQ-ACK fed back by each of the terminal device, a plurality of terminal devices can be instructed, by using one piece of downlink control information, to feed back HARQ-ACKs, reducing load of a downlink control channel.

The following uses the terminal device 110 as an example for description. A method for sending an HARQ-ACK by the terminal device 120, the terminal device 130, and the terminal device 140 is similar to a method for sending an HARQ-ACK by the terminal device 110, and details are not described herein again.

Step 202: The terminal device 110 receives the HARQ-ACK feedback indication information sent by the network device 100.

Step 203: The terminal device 110 sends an HARQ-ACK to the network device 100 based on a transmission time interval commonly occupied by at least one terminal device to feed back an HARQ-ACK and the proprietary information about the HARQ-ACK fed back by the terminal device 110 in the HARQ-ACK feedback indication information.

Because more than four terminal devices that can be scheduled by a network device may exist in an area served by the network device, a channel capacity that needs to be occupied to notify all terminal devices of HARQ-ACK feedback indication information by using one piece of downlink control information is relatively large, and the channel capacity easily constitutes a limitation. To avoid such a case, optionally, before sending the first downlink control information, the network device group all terminal devices that can be scheduled in the served area, and the network device 100 scrambles, by using different radio network temporary identifiers (RNTI), the first downlink control information of the terminal devices that belong to different groups. The network device 100 includes a plurality of preset RNTIs used to scramble the first downlink control information and identifier numbers in a one-to-one correspondence with the plurality of preset RNTIs.

Specifically, the terminal device 110, the terminal device 120, the terminal device 130, and the terminal device 140 belong to one terminal group. The terminal device 110 is used as an example. An RNTI subset corresponding to the terminal group and an identifier number corresponding to an RNTI in the RNTI subset are preconfigured on the terminal device 110. The identifier number is in a one-to-one correspondence with the RNTI. The RNTI subset includes one or more of the plurality of preset RNTIs in the network device 100. The network device 100 searches, based on the terminal group in which the terminal device 110, the terminal device 120, the terminal device 130, and the terminal device 140 are located, the plurality of preset RNTIs for the RNTI subset corresponding to the terminal group, and selects an RNTI from the RNTI subset to scramble the first downlink control information; and sends an identifier number of the selected RNTI to each of the terminal device 110, the terminal device 120, the terminal device 130, and the terminal device 140, where the identifier number is used to uniquely identify the selected RNTI.

The terminal device 110 is used as an example. After receiving an identifier number of an RNTI that is sent by the network device 100 to scramble the first downlink control information, the terminal device 110 searches for, based on the correspondence between the RNTI in the preset RNTI subset and the identifier number, the RNTI corresponding to the received identifier number, and descrambles the received first downlink control information based on the found RNTI.

For example, four preset RNTIs in the network device 100 are used to scramble the first downlink control information, and specifically include RNTI 1, RNTI 2, RNTI 3, and RNTI 4. Identifier numbers respectively corresponding to RNTI 1, RNTI 2, RNTI 3, and RNTI 4 are 00, 01, 10, and 11, and RNTIs preconfigured in the terminal device 110, the terminal device 120, the terminal device 130, and the terminal device 140 are RNTI 1 and RNTI 2, and the terminal device 110, the terminal device 120, the terminal device 130, and the terminal device 140 pre-store a correspondence between the RNTI 1, the RNTI 2 and identifier numbers 00, 01. RNTI 1 corresponds to the identifier number 00, and RNTI 2 corresponds to the identifier number 01. A correspondence between an RNTI and an identifier number in the network device is consistent with a correspondence between an RNTI and an identifier number in a terminal device. If the network device 100 selects RNTI 1 to scramble downlink control information, it indicates that the number 00 is sent to the terminal device 110, the terminal device 120, the terminal device 130, and the terminal device 140.

Optionally, in a manner of sending an identifier number of an RNTI, the network device 100 separately sends second downlink control information to the terminal device 110, the terminal device 120, the terminal device 130, and the terminal device 140, and the second downlink control information includes the identifier number of the selected RNTI.

FIG. 4 is used as an example. The network device 100 may send the second downlink control information in a transmission time interval in which the network device 100 separately sends downlink data to the terminal device 110, the terminal device 120, the terminal device 130, and the terminal device 140. For example, FIG. 4 is used as an example. The network device 100 may send the second downlink control information to the terminal device 110 in the transmission time intervals 5, 16, and 18.

It should be noted that the network device 100 may further separately send the identifier number of the selected RNTI to the terminal device 110, the terminal device 120, the terminal device 130, and the terminal device 140 by using higher layer signaling.

In addition, a correspondence that is between an RNTI in an RNTI subset and an identifier number and that is pre-stored in a terminal device may further be a correspondence between an RNTI in a same RNTI subset sent by the network device 100 to the terminal device 110, the terminal device 120, the terminal device 130, and the terminal device 140 after configuring the plurality of preset RNTIs and an identifier number.

Specifically, the correspondence between the RNTI in the same RNTI subset and the identifier number may be sent to the terminal device 110, the terminal device 120, the terminal device 130, and the terminal device 140 by using higher layer signaling such as Radio Resource Control (RRC) signaling.

In the embodiments of the present disclosure, one piece of HARQ-ACK feedback indication information may include proprietary information used to indicate a plurality of terminal devices and further includes a transmission time interval commonly occupied by the terminal devices. Therefore, to enable the terminal devices to find, after receiving the HARQ-ACK feedback indication information, bits that are used to indicate proprietary information of the terminal devices and bits that are used to indicate the transmission time interval commonly occupied by the terminal devices, the network device and the terminal devices may agree on a location order of information in the HARQ-ACK feedback indication information in advance. For example, FIG. 3b is used as an example. The first N bits in the HARQ-ACK feedback indication information are used to indicate the transmission time interval commonly occupied by the terminal devices. That is, $0^{th}$ to $(N-1)^{th}$ bits are used to indicate the transmission time interval commonly occupied by the terminal devices. Bits starting from an $N^{th}$ bit are used to indicate proprietary information of the terminal devices. A bit quantity M occupied to indicate proprietary information of each terminal device may be agreed on in advance. If bits from the $N^{th}$ bit to an $(N+M-1)^{th}$ bit indicate proprietary information of the terminal device 110, bits from an $(N+M)^{th}$ bit to an $(N+2M-1)^{th}$ bit indicate proprietary information of the terminal device 120, and so on. A bit to which information that needs to be read by the terminal devices corresponds may be preset in the terminal devices. The terminal device 110 is used as an example. Read information used to read the HARQ-ACK feedback indication information is preset in the terminal device. Specific read information includes a start bit 0 used to indicate the transmission time interval commonly occupied by the terminal devices, a bit quantity N used to indicate the transmission time interval commonly occupied by the terminal devices, a start bit N used to indicate proprietary information of the terminal device 110, and an occupied bit quantity M. After receiving the HARQ-ACK feedback indication information sent by the network device 100, the terminal device 110 reads the HARQ-ACK feedback indication information based on preset read information of information in the HARQ-ACK feedback indication information.

In addition, a terminal device (for example, a mobile phone) that can be scheduled in an area served by the network device 100 may change. Therefore, proprietary information that is used to indicate the terminal device and that is in HARQ-ACK feedback indication information may also change. Therefore, an implementation of presetting read information in a terminal is relatively difficult to implement in practice. Based on this, optionally, the transmission time interval commonly occupied by the at least one terminal device in the HARQ-ACK feedback indication information is common information. Therefore, no matter whether the terminal device changes, a location of the information may be fixed. For example, the network device and the terminal device may agree on in advance that a $0^{th}$ bit to an $(N-1)^{th}$ bit in the HARQ-ACK feedback indication information are used to indicate the transmission time interval commonly occupied by the at least one terminal device. In addition, the bit quantity M of proprietary information that is used to instruct each terminal device and that is in the HARQ-ACK feedback indication information may not change, the network device and the terminal device may further agree on in advance the bit quantity M of the proprietary information that is used to instruct each terminal device and that is in the HARQ-ACK feedback indication information, but a start bit of the proprietary information that is used to instruct each terminal device and that is in the HARQ-ACK feedback indication information changes. Therefore, the terminal device 110 is used as an example. The network device 100 sends location index information corresponding to the terminal device 110 to the terminal device 110. The location index information is used to indicate a location of a bit quantity of an HARQ-ACK fed back by the terminal device 110 and/or a channel resource used to feed back the HARQ-ACK in the HARQ-ACK feedback indication information, and the location index information may indicate a start bit of the proprietary information of the terminal device in the HARQ-ACK feedback indication information.

It should be understood that the location index information sent by the network device 100 to the terminal device may further be a location number used to indicate a location of a bit quantity of the HARQ-ACK fed back by the terminal device and/or a channel resource used to feed back the HARQ-ACK in the HARQ-ACK feedback indication information. For example, the network device and terminal device agree on in advance a location of the transmission time interval commonly occupied by the at least one terminal device in the HARQ-ACK feedback indication information and the bit quantity used to indicate the proprietary information of each terminal device in the HARQ-ACK feedback indication information. The location index information is used to indicate the bit quantity of the HARQ-ACK fed back by the terminal device 110 and/or the first location of the channel resource used to feed back the HARQ-ACK in the HARQ-ACK feedback indication information. The network device 110 sends a location number 00 to the terminal device 110, and instructs the terminal device 110 to read indication information corresponding to the location number 00.

Specifically, proprietary information respectively used to instruct the terminal device 110, the terminal device 120, the terminal device 130, and the terminal device 140 is arranged in an order of the terminal device 110, the terminal device 120, the terminal device 130, and the terminal device 140. Assuming that location numbers of the proprietary information used to instruct the terminal device 110, the terminal device 120, the terminal device 130, and the terminal device 140 to feed back are 00, 01, 10, and 11 respectively, the network device 100 sends the location number 00 to the terminal device 110, sends the location number 01 to the terminal device 120, sends the location number 10 to the terminal device 130, and sends the location number 11 to the terminal device 140.

The terminal device 110 is used as an example. After the location number 00 is received, because the network device and terminal device agree on in advance the location of the transmission time interval commonly occupied by the at least one terminal device in the HARQ-ACK feedback indication information and the bit quantity of the proprietary information that is used to instruct each terminal device and that is in the HARQ-ACK feedback indication information, assuming that the transmission time interval commonly occupied by the at least one terminal device occupies $0^{th}$ to $(N-1)^{th}$ bits in the HARQ-ACK feedback indication information, and the bit quantity of the proprietary information that is used to instruct each terminal device and that is in the HARQ-ACK feedback indication information is M, the location number 00 corresponds to data of $N^{th}$ to $(N+M-1)^{th}$ bits, and the terminal device 110 reads the data of an $N^{th}$ to $(N+M-1)^{th}$ bit segment and a 0th to $(N-1)^{th}$ bit segment.

Specifically, the network device 100 sends third downlink control information to the terminal device 110, where the third downlink control information includes the location index information corresponding to the terminal device 110.

It should be noted that the second downlink control information and the third downlink control information in the embodiments of the present disclosure may be same downlink control information.

After the terminal device 110 receives the location index information, the terminal device 110 searches, based on the location index information, the HARQ-ACK feedback indication information for the proprietary information used to instruct the terminal device 110 to feed back.

FIG. 3b is used as an example, assuming that a start location of the proprietary information that is used to instruct the terminal device 110 and that is in HARQ-ACK feedback indication information is a sixth bit, the network device 100 sends 110 to the terminal device 110, and 110 corresponds to the start location, namely, the sixth bit. After the terminal device 110 receives 110, the terminal device 110 reads information that starts from the sixth bit and whose length is M bits.

Based on a same disclosure conception, an embodiment of the present disclosure further provides a network device. A method corresponding to the network device is a method for sending indication information in the embodiments of the present disclosure. Therefore, for implementation of the network device in this embodiment of the present disclosure, refer to implementation of the method, and repeated parts are not described again.

Figure 5:
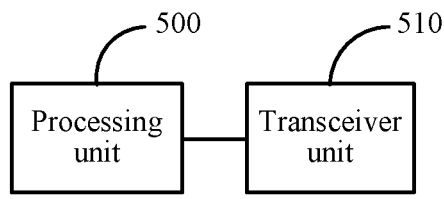
FIG. 5 is a schematic structural diagram of a network device according to an embodiment of the present disclosure.

As shown in FIG. 5, the network device in this embodiment of the present disclosure includes: a processing unit 500 and a transceiver unit 510, where the processing unit 500 is configured to determine hybrid automatic repeat request-acknowledgment HARQ-ACK feedback indication information used to instruct at least one terminal device to feed back, where the HARQ-ACK feedback indication information is used to indicate a transmission time interval commonly occupied by the at least one terminal device to feed back an HARQ-ACK and proprietary information about an HARQ-ACK fed back by each of the at least one terminal device, and the proprietary information includes a bit quantity of the HARQ-ACK that each of the at least one terminal device needs to feed back and/or a channel resource used by each terminal device to feed back the HARQ-ACK; and the transceiver unit 510 is configured to send the HARQ-ACK feedback indication information to the at least one terminal device.

Optionally, the transceiver unit 510 is specifically configured to send first downlink control information to the at least one terminal device, where the first downlink control information includes the HARQ-ACK feedback indication information.

Optionally, the first downlink control information is transmitted in a common search space of a downlink control channel.

Optionally, the network device includes a plurality of preset radio network temporary identifiers RNTIs used to scramble the first downlink control information; the processing unit 500 is further configured to: before the transceiver unit sends the first downlink control information to the at least one terminal device, search, based on a terminal group to which the at least one terminal device belongs, the plurality of preset RNTIs for an RNTI subset corresponding to the terminal group, and select an RNTI from the RNTI subset to scramble the first downlink control information; and the transceiver unit 510 is further configured to separately send an identifier number of the selected RNTI to the at least one terminal device, where the identifier number is used to uniquely identify the selected RNTI.

Optionally, the transceiver unit 510 is specifically configured to separately send second downlink control information to the at least one terminal device, where the second downlink control information includes the identifier number of the selected RNTI.

Optionally, the processing unit 500 is further configured to send, to an N$^{th}$ terminal device of the at least one terminal device, location index information corresponding to the N$^{th}$ terminal device, where the location index information is used to indicate a location of a bit quantity of an HARQ-ACK fed back by the N$^{th}$ terminal device and/or a channel resource used to feed back the HARQ-ACK in the HARQ-ACK feedback indication information, and N ranges from 1 to a quantity of the at least one terminal device.

Optionally, the transceiver unit 510 is specifically configured to send third downlink control information to the N$^{th}$ terminal device, where the third downlink control information includes the location index information.

Optionally, the processing unit 500 is specifically configured to: indicate an offset value between the transmission time interval commonly occupied by the at least one terminal device to feed back the HARQ-ACK and a transmission time interval occupied to send the HARQ-ACK feedback indication information, where the offset value is used to indicate a quantity of transmission time intervals between the transmission time interval commonly occupied by the at least one terminal device to feed back the HARQ-ACK and the transmission time interval occupied to send the HARQ-ACK feedback indication information; or indicate a number of the transmission time interval commonly occupied by the at least one terminal device to feed back the HARQ-ACK.

Figure 6:
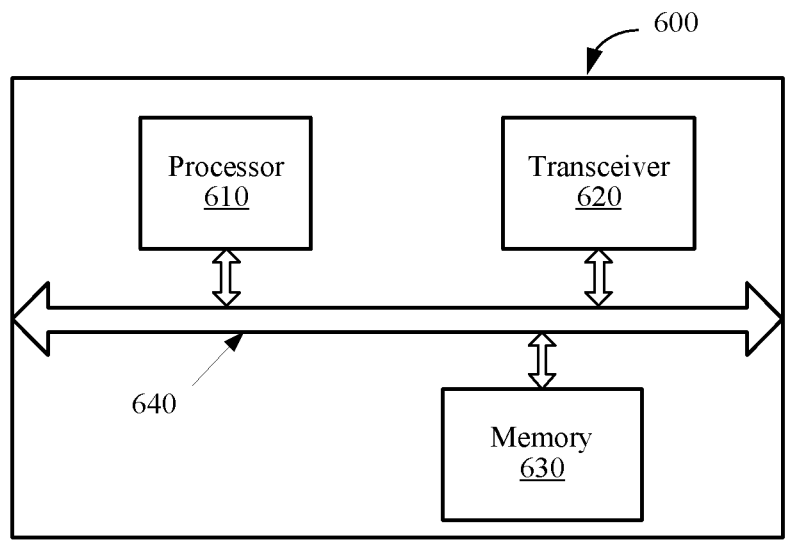
FIG. 6 is a schematic diagram of a hardware structure of a network device according to an embodiment of the present disclosure.

It should be noted that in this embodiment of the present disclosure, the processing unit 500 may be implemented by using a processor, and the transceiver unit 510 may be implemented by using a transceiver. As shown in FIG. 6, a network device 600 may include a processor 610, a transceiver 620, and a memory 630. The memory 630 may be configured to store a program/code preinstalled when the network device 600 is delivered from a factory, or may store code or the like for execution by the processor 610.

Components of the network device 600 are coupled together by using a bus system 640. In addition to a data bus, the bus system 640 further includes a power bus, a control bus, and a status signal bus.

The processor 610 may use a general-purpose central processing unit (CPU), a microprocessor, an application-specific integrated circuit (ASIC), or one or more integrated circuits to perform related operations, to implement the technical solutions provided in the embodiments of the present disclosure.

It should be noted that although the network device 600 shown in FIG. 6 shows only the processor 610, the transceiver 620, and the memory 630, in a specific implementation process, persons skilled in the art should understand that the network device further includes other devices indispensable for implementing normal operation. In addition, based on a specific requirement, persons skilled in the art should understand that the network device may further include a hardware device for implementing another additional function. In addition, persons skilled in the art should understand that the network device may alternatively include only necessary devices or modules for implementing this embodiment of the present disclosure, and does not need to include all devices shown in FIG. 6.

Persons of ordinary skill in the art may understand that all or some of the processes of the methods in the embodiments may be implemented by a computer program instructing relevant hardware. The program may be stored in a computer readable storage medium. When the program is executed, the processes of the embodiments of the methods may be included. The foregoing storage medium may be a magnetic disk, an optical disc, a read-only memory (ROM), or a random access memory (RAM).

Based on a same disclosure conception, an embodiment of the present disclosure further provides a terminal device. A method corresponding to the terminal device is the method for sending an HARQ-ACK in the embodiments of the present disclosure. Therefore, for implementation of the terminal device in this embodiment of the present disclosure, refer to implementation of the method, and repeated parts are not described again.

Figure 7:
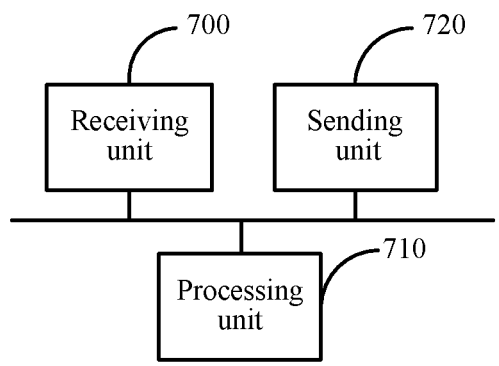
FIG. 7 is a schematic structural diagram of a terminal device according to an embodiment of the present disclosure.

As shown in FIG. 7, the terminal device in this embodiment of the present disclosure includes a receiving unit 700, a processing unit 710, and a sending unit 720, where the receiving unit 700 is configured to receive HARQ-ACK feedback indication information sent by a network device, where the HARQ-ACK feedback indication information is used to indicate a transmission time interval commonly occupied by at least one terminal device to feed back an HARQ-ACK and proprietary information about an HARQ-ACK fed back by each of the at least one terminal device, the proprietary information includes a bit quantity of the HARQ-ACK that each of the at least one terminal device needs to feed back and/or a channel resource used by each terminal device to feed back the HARQ-ACK, and the at least one terminal device includes the terminal device in which the receiving unit 700 is located; the processing unit 710 is configured to determine, based on the HARQ-ACK feedback indication information, a transmission time interval occupied by the terminal device in which the processing unit 710 is located to feed back an HARQ-ACK to the network device and proprietary information about the HARQ-ACK fed back; and the sending unit 720 is configured to send the HARQ-ACK to the network device based on the determined transmission time interval occupied to feed back the HARQ-ACK to the network device and the determined proprietary information about the HARQ-ACK fed back.

Optionally, the receiving unit 700 is specifically configured to receive first downlink control information, where the first downlink control information includes the HARQ-ACK feedback indication information.

Optionally, the first downlink control information is transmitted in a common search space of a downlink control channel.

Optionally, the terminal device pre-stores a correspondence between at least one radio network temporary identifier RNTI and an identifier number respectively corresponding to the at least one RNTI, the RNTI is in a one-to-one correspondence with the identifier number, the at least one RNTI belongs to an RNTI subset corresponding to a terminal group to which the terminal device belongs, and the RNTI subset is a subset of a plurality of RNTIs that are preset in the network device to scramble the first downlink control information; the receiving unit 700 is further configured to: before the sending unit 720 sends the HARQ-ACK to the network device, receive an identifier number of an RNTI that is sent by the network device to scramble the first downlink control information; and the processing unit 710 is configured to: search, based on the correspondence, the at least one RNTI for the RNTI corresponding to the received identifier number, and descramble the received first downlink control information based on the found RNTI.

Optionally, the receiving unit 700 is specifically configured to receive second downlink control information sent by the network device, where the second downlink control information includes the identifier number of the RNTI used to scramble the first downlink control information.

Optionally, the receiving unit 700 is further configured to receive location index information that is sent by the network device and that corresponds to the terminal device, where the location index information is used to indicate a location of a bit quantity of the HARQ-ACK fed back by the terminal device and/or a channel resource used to feed back the HARQ-ACK in the HARQ-ACK feedback indication information.

Optionally, the receiving unit 700 is specifically configured to receive third downlink control information sent by the network device, where the third downlink control information includes the location index information corresponding to the terminal device.

Optionally, the processing unit 710 determines, in the following manners, a transmission time interval occupied to send the HARQ-ACK:

based on an offset value between the transmission time interval commonly occupied by the at least one terminal device to feed back the HARQ-ACK and included in the HARQ-ACK feedback indication information and a transmission time interval occupied to send the HARQ-ACK feedback indication information, determining the transmission time interval occupied to send the HARQ-ACK, where the offset value is used to indicate a quantity of transmission time intervals between the transmission time interval commonly occupied by the at least one terminal device to feed back the HARQ-ACK and the transmission time interval occupied to send the HARQ-ACK feedback indication information; or based on a number of the transmission time interval that is commonly occupied by the at least one terminal device to feed back the HARQ-ACK and that is included in the HARQ-ACK feedback indication information, determining the transmission time interval occupied to send the HARQ-ACK.

Figure 8:
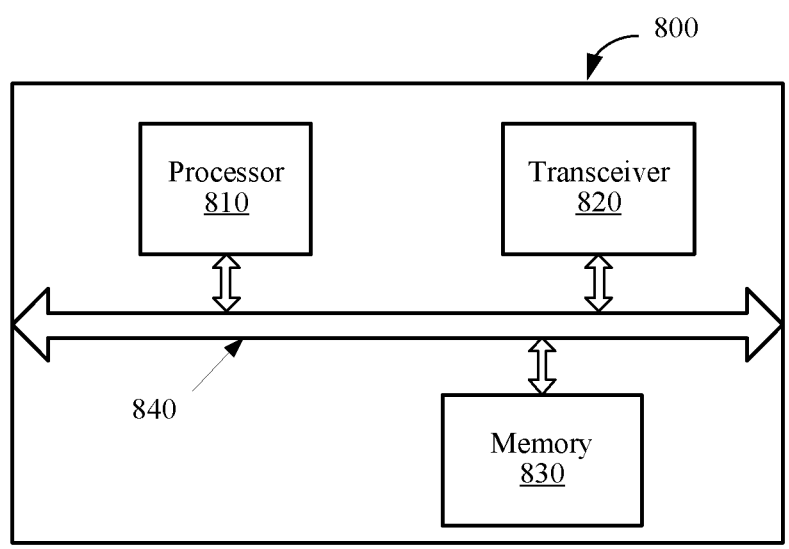
FIG. 8 is a schematic diagram of a hardware structure of a terminal device according to an embodiment of the present disclosure.

It should be noted that in this embodiment of the present disclosure, the processing unit 710 may be implemented by a processor, and the receiving unit 700 and the sending unit 720 may be implemented by a transceiver. As shown in FIG. 8, a terminal device 800 may include a processor 810, a transceiver 820, and a memory 830. The memory 830 may be configured to store a program/code preinstalled when the terminal device 800 is delivered from a factory, or may store code or the like for execution by the processor 810.

Components of the terminal device 800 are coupled together by using a bus system 840. In addition to a data bus, the bus system 840 includes a power bus, a control bus, and a status signal bus.

The processor 810 may use a general-purpose central processing unit (CPU), a microprocessor, an application-specific integrated circuit (ASIC), or one or more integrated circuits to perform related operations, to implement the technical solutions provided in the embodiments of the present disclosure.

It should be noted that although the terminal device 800 shown in FIG. 8 shows only the processor 810, the transceiver 820, and the memory 830, in a specific implementation process, persons skilled in the art should understand that the terminal device further includes other devices indispensable for implementing normal operation. In addition, persons skilled in the art should understand that the terminal device may further include a hardware device for implementing another additional function. In addition, persons skilled in the art should understand that, the terminal device may also include only a component or module required for implementing this embodiment of the present disclosure, but not necessarily include all the components shown in FIG. 8.

Persons of ordinary skill in the art may understand that all or some of the processes of the methods in the embodiments may be implemented by a computer program instructing relevant hardware. The program may be stored in a computer readable storage medium. When the program is executed, the processes of the embodiments of the methods may be included. The foregoing storage medium may include a magnetic disk, an optical disc, a read-only memory (ROM), or a random access memory (RAM).

It can be learned from the foregoing content that in the embodiments of the present disclosure, the network device determines the hybrid automatic repeat request-acknowledgment HARQ-ACK feedback indication information used to instruct the at least one terminal device to feed back, where the HARQ-ACK feedback indication information is used to indicate the transmission time interval commonly occupied by the at least one terminal device to feed back the HARQ-ACK and the proprietary information about the HARQ-ACK fed back by each of the at least one terminal device, and the proprietary information includes the bit quantity of the HARQ-ACK that each of the at least one terminal device needs to feed back and/or the channel resource used by each terminal device to feed back the HARQ-ACK; and sends the HARQ-ACK feedback indication information to the at least one terminal device. In addition, the first terminal device receives the HARQ-ACK feedback indication information sent by the network device, and sends the HARQ-ACK to the network device based on the transmission time interval commonly occupied by the at least one terminal device to feed back the HARQ-ACK and the proprietary information about the HARQ-ACK fed back by the first terminal device in the HARQ-ACK feedback indication information. In such a technical solution, the HARQ-ACK feedback indication information that is sent by the network device to the terminal devices includes not only the transmission time interval commonly occupied by the terminal devices to feed back HARQ-ACKs, but also the proprietary information about the HARQ-ACKs fed back by the terminal devices, compared with the prior art in which the network device indicates only the subframe or the TTI in which the HARQ-ACK is fed back, the terminal devices can feed back the HARQ-ACKs to the network device based on the proprietary information that is in the indication information and that is used to instruct the terminal devices to feed back the HARQ-ACKs, thereby avoiding redundancy when the terminals feed back the HARQ-ACKs and limitation of the performance of the uplink control channel.

Persons skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a CD-ROM, an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams, and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specified function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although the embodiments of the present disclosure have been described, persons skilled in the art can make changes and modifications to these embodiments once they learn the basic inventive concept. Therefore, the following claims are intended to be construed as to cover the preferred embodiments and all changes and modifications falling within the scope of the present disclosure.

Obviously, persons skilled in the art can make various modifications and variations to the present disclosure without departing from the scope of the present disclosure. The present disclosure is intended to cover these modifications and variations provided that they fall within the scope of protection defined by the following claims and their equivalent technologies.

What is claimed is:

1. A method for sending indication information, the method comprising:
   determining, by a network device, hybrid automatic repeat request-acknowledgment (HARQ-ACK) feedback indication information for instructing at least one terminal device to feed back, wherein the HARQ-ACK feedback indication information comprises information indicating a transmission time interval for the at least one terminal device to feed back a HARQ-ACK and proprietary information specific to the at least one terminal device, wherein the proprietary information comprises at least one of following:
      a bit quantity of the HARQ-ACK that the at least one terminal device is to feed back, or
      a channel resource used by the at least one terminal device to feed back the HARQ-ACK; and
   sending, by the network device, the HARQ-ACK feedback indication information to the at least one terminal device,
   wherein sending, by the network device, the HARQ-ACK feedback indication information to the at least one terminal device comprises:
   sending, by the network device, first downlink control information to the at least one terminal device, wherein the first downlink control information comprises the HARQ-ACK feedback indication information,
   wherein:
   the network device comprises a plurality of preset radio network temporary identifiers (RNTIs) used to scramble the first downlink control information; and
   before sending, by the network device, the first downlink control information to the at least one terminal device, the method further comprises:
   searching, by the network device based on a terminal group to which the at least one terminal device belongs, the plurality of preset RNTIs for an RNTI subset corresponding to the terminal group, and selecting an RNTI from the RNTI subset to scramble the first downlink control information, and
   separately sending, by the network device, an identifier number of the selected RNTI to the at least one terminal device for uniquely identify the selected RNTI,
   wherein separately sending, by the network device, an identifier number of the selected RNTI to the at least one terminal device comprises:
   separately sending, by the network device, second downlink control information to the at least one terminal device, wherein the second downlink control information comprises the identifier number of the selected RNTI.

2. The method according to claim 1, further comprising:
   sending, by the network device to an Nth terminal device of the at least one terminal device, location index information corresponding to the Nth terminal device for indicating at least one of the following:
   a location of a bit quantity of a HARQ-ACK fed back by the Nth terminal device, or
   a channel resource used to feed back the HARQ-ACK in the HARQ-ACK feedback indication information; and
   wherein N ranges from 1 to a quantity of the at least one terminal device.

3. The method according to claim 2, wherein sending, by the network device to an Nth terminal device of the at least one terminal device, location index information corresponding to the Nth terminal device comprises:
   sending, by the network device, third downlink control information to the Nth terminal device, wherein the third downlink control information comprises the location index information.

4. The method according to claim 1, wherein indicating, by the network device, the transmission time interval commonly occupied by the at least one terminal device to feed back the HARQ-ACK comprises:
   indicating, by the network device, an offset value between the transmission time interval commonly occupied by the at least one terminal device to feed back the HARQ-ACK and a transmission time interval occupied to send the HARQ-ACK feedback indication information, wherein the offset value is used to indicate a quantity of transmission time intervals between the transmission time interval commonly occupied by the at least one terminal device to feed back the HARQ-ACK and the transmission time interval occupied to send the HARQ-ACK feedback indication information; or indicating, by the network device, a number of the transmission time interval commonly occupied by the at least one terminal device to feed back the HARQ-ACK.

5. A method for sending a hybrid automatic repeat request-acknowledgment (HARQ-ACK), the method comprising:
receiving, by a first terminal device, HARQ-ACK feedback indication information sent by a network device, wherein the HARQ-ACK feedback indication information indicates a transmission time interval for the terminal device to feed back a HARQ-ACK and proprietary information specific to the at least one terminal device, wherein the proprietary information comprises at least one of following:
a bit quantity of the HARQ-ACK that the terminal device is to feed back, or
a channel resource used by the terminal device to feed back the HARQ-ACK,
wherein receiving, by the first terminal device, the HARQ-ACK feedback indication information sent by the network device comprises:
receiving, by the first terminal device, first downlink control information, wherein the first downlink control information comprises the HARQ-ACK feedback indication information;
sending, by the first terminal device, a HARQ-ACK to the network device based on the transmission time interval commonly occupied by the at least one terminal device to feed back the HARQ-ACK and the proprietary information about the HARQ-ACK fed back by the first terminal device in the HARQ-ACK feedback indication information,
pre-storing, by the first terminal device, a correspondence between at least one radio network temporary identifier (RNTI) and an identifier number respectively corresponding to the at least one RNTI, wherein the RNTI is in a one-to-one correspondence with the identifier number, the at least one RNTI belongs to an RNTI subset corresponding to a terminal group to which the first terminal device belongs, and the RNTI subset is a subset of a plurality of RNTIs that are preset in the network device to scramble the first downlink control information; and
before sending, by the first terminal device, a HARQ-ACK to the network device, the method further comprises:
receiving, by the first terminal device, an identifier number of an RNTI that is sent by the network device to scramble the first downlink control information,
searching, by the first terminal device based on the correspondence, the at least one RNTI for the RNTI corresponding to the received identifier number, and
descrambling, by the first terminal device, the received first downlink control information based on the found RNTI,
wherein receiving, by the first terminal device, the identifier number of the RNTI that is sent by the network device to scramble the first downlink control information comprises:
receiving, by the first terminal device, second downlink control information sent by the network device, wherein the second downlink control information comprises the identifier number of the RNTI used to scramble the first downlink control information.

6. The method according to claim 5, further comprising:
receiving, by the first terminal device, location index information that is sent by the network device and that corresponds to the first terminal device, wherein the location index information is used to indicate at least one of the following:
a location of a bit quantity of the HARQ-ACK fed back by the first terminal device, or
a channel resource used to feed back the HARQ-ACK in the HARQ-ACK feedback indication information.

7. The method according to claim 6, wherein receiving, by the first terminal device, the location index information that is sent by the network device and that corresponds to the first terminal device comprises:
receiving, by the first terminal device, third downlink control information sent by the network device, wherein the third downlink control information comprises the location index information corresponding to the first terminal device.

8. The method according to claim 5, further comprising:
determining, by the first terminal device the transmission time interval occupied to send the HARQ-ACK based on:
an offset value between the transmission time interval commonly occupied by the at least one terminal device to feed back the HARQ-ACK and comprised in the HARQ-ACK feedback indication information and a transmission time interval occupied to send the HARQ-ACK feedback indication information, wherein the offset value is used to indicate a quantity of transmission time intervals between the transmission time interval commonly occupied by the at least one terminal device to feed back the HARQ-ACK and the transmission time interval occupied to send the HARQ-ACK feedback indication information, or
a number of the transmission time interval that is commonly occupied by the at least one terminal device to feed back the HARQ-ACK and that is comprised in the HARQ-ACK feedback indication information.

9. A terminal device, comprising:
a receiver, configured to receive hybrid automatic repeat request-acknowledgment (HARQ-ACK) feedback indication information sent by a network device, wherein the HARQ-ACK feedback indication information indicates a transmission time interval for the terminal device to feed back a HARQ-ACK and proprietary information specific to the at least one terminal device, wherein the proprietary information comprises at least one of following:
a bit quantity of the HARQ-ACK that the terminal device is to feed back, or
a channel resource used by the terminal device to feed back the HARQ-ACK;
a processor, configured to determine, based on the HARQ-ACK feedback indication information, a transmission time interval occupied by the terminal device to feed back the HARQ-ACK to the network device and proprietary information about the HARQ-ACK fed back; and
a transmitter, configured to send the HARQ-ACK to the network device based on the determined transmission time interval occupied to feed back the HARQ-ACK to the network device and the determined proprietary information about the HARQ-ACK fed back,
wherein the receiver is configured to:
receive first downlink control information, wherein the first downlink control information comprises the HARQ-ACK feedback indication information, wherein:
the terminal device is configured to pre-store a correspondence between at least one radio network temporary identifier (RNTI) and an identifier number respectively corresponding to the at least one RNTI, wherein the RNTI is in a one-to-one correspondence with the identifier number, the at least one RNTI belongs to an RNTI subset corresponding to a terminal group to which the terminal device belongs, and the RNTI subset is a subset of a plurality of RNTIs that are preset in the network device to scramble the first downlink control information;
the receiving unit is further configured to:
before the transmitter sends the HARQ-ACK to the network device, receive an identifier number of an RNTI that is sent by the network device to scramble the first downlink control information; and
the processor is configured to:
search, based on the correspondence, the at least one RNTI for the RNTI corresponding to the received identifier number, and
descramble the received first downlink control information based on the found RNTI,
wherein to receive the identifier number of the RNTI that is sent by the network device to scramble the first downlink control information, the receiving unit is configured to:

receive second downlink control information sent by the network device, wherein the second downlink control information comprises the identifier number of the RNTI used to scramble the first downlink control information.

10. The terminal device according to claim 9, wherein the receiving unit is further configured to:
receive location index information that is sent by the network device and that corresponds to the terminal device, wherein the location index information is used to indicate at least one of the following:
a location of the bit quantity of the HARQ-ACK fed back by the terminal device, or
the channel resource used to feed back the HARQ-ACK in the HARQ-ACK feedback indication information.

11. The terminal device according to claim 10, wherein to receive the location index information that is sent by the network device and that corresponds to the terminal device, the receiving unit is configured to:
receive third downlink control information sent by the network device, wherein the third downlink control information comprises the location index information corresponding to the terminal device.

* * * * *